June 14, 1949.  W. A. WEBB  2,473,184
PROCESS FOR PREPARATION OF
DEHYDRATED FOOD PRODUCTS
Filed Dec. 2, 1947

INVENTOR
Wells Alan Webb.
By Robert H. Eanoff,
His attorney

Patented June 14, 1949

2,473,184

UNITED STATES PATENT OFFICE 2,473,184

PROCESS FOR PREPARATION OF DEHYDRATED FOOD PRODUCTS

Wells Alan Webb, San Jose, Calif.

Application December 2, 1947, Serial No. 789,211

10 Claims. (Cl. 99—204)

This is a continuation in part of my application Serial No. 439,384 filed April 17, 1942, now abandoned, which was a division of application Serial No. 258,452 filed February 25, 1939, now Patent 2,283,302, May 19, 1942.

The present invention relates to preparation of food compositions by rendering certain food substances porous and rigid by dehydration in liquid media and to the impregnation of the pores of such rigid food substances to produce edible products suitable for incorporation into confections, cakes, ices, and like products.

An object of the invention is to provide a novel method for dehydration of fruit and other foods.

Another object of the invention is to provide a method whereby the moisture absorbing capacity of dehydrated porous foods may be reduced or eliminated.

Another object of the invention is to provide a method enabling liquid fats or other fluids to be injected into the pores and cells of puffed fruits, puffed grains and other porous food articles, thereby to increase the nutritional content of said foods.

Another object of the invention is to provide a method or covering the outer surfaces of particles of dehydrated fruit with a protective medium, thereby to prevent absorption of moisture and adhesion of adjacent particles to one another.

A further object is to provide a number of new and delicious food compositions, comprising ices, cakes, confections and like food containing impregnated fruit.

Another object of the present invention is to provide a process for producing a substantially dehydrated fruit having a puffed or distended structure whereby the actual appearance of the fruit is approximated.

The invention has other objects which with the foregoing will be set forth with the description of the preferred forms of the invention. It is to be understood, however, that I do not limit myself to said description, as I may adopt variations from said forms within the scope of the invention as set forth in the claims.

In my patent No. 2,110,184, issued March 8, 1938, I disclosed a method for puffing and dehydrating fruit whereby crisp, distended whole pieces or particles of fruit may be produced. Fruit produced by said method possesses the disadvantage of being hygroscopic to the extent that in a normal atmosphere it will absorb in a few hours sufficient moisture to destroy all crispness. This hygroscopic quality prevents such fruit from remaining crisp or firm when incorporated into ices, cakes and like prepared foods.

In the process referred to in the preceding paragraph, dehydration takes place in a vacuum. The absence of substantial concentration of any gaseous medium from the processing chamber makes it necessary for the heat required for the evaporation of moisture from the fruit to be transmitted to the fruit chiefly by means of radiant heat waves emanating from heated surfaces located adjacent to the fruit. Thus, the surfaces of the fruit which are directly exposed to the heat waves emanating from the heated surfaces are liable to overheating or charring, whereas simultaneously the hidden portions or surfaces not exposed to direct heat emanations may be subject to underheating and unsatisfactory dehydration. These limitations make it impossible to dehydrate batches of fruit in deep layers successfully. A more expensive method must be used by which the fruit is spread out thinly so that as large a portion as possible may be directly exposed to the radiating surface in order that the fruit may become satisfactorily dehydrated throughout.

I have now found that with the aid of a liquid medium and reduced pressure, fruit or other food may be rapidly and satisfactorily dehydrated in deep layers and under reduced pressure without causing substantial decomposition of the fruit sugar. By my new method, heat is applied to all portions of the food by means of a heated edible liquid such as an edible fat, liquid petrolatum or other odorless, tasteless hydrocarbon oil of such a nature that its consumption by humans is not objectionable, glycerine, lecithin, liquid sugars such as corn syrup or other suitable medium; the liquid should have a vapor pressure sufficiently low that water can be rapidly removed from the fruit. The liquid medium is cycled successively through an external heater, and through the food being dehydrated. The external heater may include a still or settling tank to remove water contained in said liquid medium.

I have also found that fruit, or other food, may be puffed without interrupting and thus lengthening the drying period through the temporary increase in pressure that was necessary by my former process. To accomplish puffing during some portion of the drying period, I now momentarily increase the temperature of the liquid medium flowing over the food. By raising the temperature of the liquid medium, I cause the rate of evaporation of moisture from within the food to increase to such an extent that the vapors inflate or puff the particles of food in the course of their escape therefrom. During this step the vapor pressure within the processing chamber may remain at a practically constant reduced value which is substantially less than the vapor pressure of the heated fruit, and drying will therefore continue without interruption through every phase of the puffing operation.

The presence of a circulating liquid medium in contact with the food has the further advantage that, following puffing and dehydration, the food may be rapidly and completely cooled by quickly lowering the temperature of the circulating liquid medium.

The initial operations of my new process comprise therefore, the steps of partially dehydrating a food in contact with a circulating liquid medium and under reduced pressure, puffing the food under a constant reduced pressure by increasing the temperature of the liquid medium and continuing the dehydration at reduced temperature until the food is substantially free of moisture.

If at the termination of this last mentioned stage of dehydration, the liquid medium is cooled and then drained away from the food prior to the restoration of normal pressure to the inside of the drying chamber, then such restoration of pressure will drive air or other gas into the expanded cells and pores of the food. The product resulting from such a sequence of operations is a puffed food containing air in its pores and carrying on its exterior a thin coating of the liquid medium. This coating may be beneficial; for example, particles of fruit puffed in the above described manner by means of a liquid are delivered from the puffing process with a protective coating of the liquid. This coating not only increases the nutritional value of the fruit, but it also retards absorption of moisture from the atmosphere, and materially reduces the tendency of adjacent particles to "cake" or stick together. The thickness of this protective coating is increased by lowering the temperature of the liquid in contact with the fruit just prior to draining the fat away. The thickness of the protective coating is decreased by cooling as little as possible and draining away the liquid at as high a temperature as possible while imparting to the fruit sufficient rigidity from the cooling step to enable the fruit to withstand the application of atmospheric pressure without materially losing its puffed structure. The thickness of the protective coating is further decreased by allowing a longer time period for draining and before application of atmospheric pressure.

The liquid adhering to the surface of the fruit after draining is driven into the outer layer of fruit by application of atmospheric or super-atmospheric pressure. In the case of certain fruits such as puffed Newtown Pippin apple slices, increasing the pressure well above atmospheric pressure to say 10 or 25 pounds per square inch gage, after the slices have been thoroughly cooled, serves to drive the liquid more completely into the pores. The result of such treatment is that the outer pores may become more or less completely impregnated. In storage, a liquid such as an oil or fat will often diffuse from the outer pores inward and the result then is an apple slice in which most of the cells are partially filled or coated with the oil and few are completely filled. For pie apples, a fat content of from 5% to 35% is considered acceptable. The pores of the apple are then only partially filled with fat while the balance of the space is air filled. A pie made from such an apple is not excessively rich, though it contains sufficient fat in the fill to give desired richness.

The termination of the last stage of dehydration may, on the other hand, be characterized by the continued presence of the cooled circulating liquid about and over the food. In such case, restoration of normal pressure serves to drive the liquid into the cells and pores of the food. The result is the full-cell impregnation of the food. For example, the cells of fruit particles puffed and dehydrated in contact with a fat become filled with fat if normal pressure is restored while the fruit remains submerged. Impregnation is, of course, improved by application of pressures above atmospheric to the covered fruit. Such full-cell impregnation may result in a fruit containing from 50% to 60% of fat, depending upon the degree to which the fruit has been puffed. The more fully impregnated product is suitable as a confection, as an ingredient of cakes and frozen desserts.

The characteristic that determines whether or not a fruit will puff resides in the ability of the fruit to form cells or pockets large or small that contain the water vapor and from which the vapor slowly leaks during dehydration. Weakly made fruit flesh like that of watermelon cannot contain the evolving vapors and hence does not puff. Grapes with tough skins but without strong internal structures or membranes are puffed because the skin contains the water vapor. Dates, figs and prunes are additional examples of fruits that puff roundly in the whole condition owing to the presence of a tough skin.

Briefly summarized, the process of this invention includes lowering the pressure on the fruit while the fruit is at an elevated temperature to facilitate moisture removal from the fruit. Since the fruits with which the present invention is particularly concerned, e. g. those having a relatively fine cell structure of a microscopic nature such as raisins, apples, pears, bananas, peaches, apricots, prunes, dates and nectarines, include fruit sugars which are altered by heat, it is essential that the fruit not be held at a temperature whereat these alter undesirably for a time sufficient to the undesirable alteration. Generally such fruit sugars caramelize at temperatures in the range of 170°–200° F.; if subject to a temperature in this range for any extended period of time, the sugars may form undesirable products and may even char. This characteristic is more pronounced in some fruits than others; for example, puffed apple slices may be colored slightly brown, to a pale yellow or to a golden color by prolongation of heat during the puffing and dehydrating process. Such slices, while unimpaired as to taste, have become chemically changed to the extent that, when the slices are incorporated into pie as apple pie fill, the slices, after cooking and cooling in the pie, become markedly darkened. On the other hand, apple slices processed by the very low absolute pressure and lower temperatures of my process are not materially darkened and produce a pie fill of exceptionally light and natural color. Similarly Thompson seedless grapes and other grapes of high sugar content, delicate flavor and color are puffed and dehydrated without materially increasing or deepening the natural color; these fruits produce a very light colored pie fill, much preferred to darker colored fills. Generally, one should employ a reduced pressure of the order of a vacuum equivalent to a half pound pressure absolute and preferably even less, of the order of a quarter of a pound absolute. At three quarters of a pound absolute, it is necessary to employ such an elevated temperature that undesirable heat alteration and even charring of the fruit sugars occur. High pressures of the order of four pounds per square inch are entirely undesirable.

Direct contact of the fruit with the dehydrating and heat conducting liquid enables an extremely rapid rate of dehydration to be obtained; for example, apples ordinarily requiring 8 to 15 hours for dehydration in ordinary drying kilns where air is the dehydrating and heat conducting medium can be completely dehydrated from the fresh state to less than 2% moisture content in my process employing heated oil and vacuum, the time required being two hours or less depending upon the thickness of the slices.

The use of a low pressure with rapid heat transfer permits apples and other fruits to be rapidly dehydrated without danger of oxidase-catalysed browning; therefore, no sulfur dioxide or other bleaching means is required. Because oxygen is excluded by covering the fruit with a liquid, and oxygen already in the fruit is removed therefrom by escaping water vapor; browning of the fruit is prevented during dehydration.

The heating of the fruit under reduced pressure enables the fruit to be dehydrated to a moisture content of 6% by weight and less; I prefer to reduce the moisture content to 2% by weight and even less; heat exchange is facilitated and simplified by utilizing a suitably heated liquid of low vapor pressure. During the heating the pressure is preferably gradually reduced so that the greatest vacuum is applied to the driest fruit. In this way, the best utilization of the low pressure is secured. Because of the cooling of the fruit due to moisture evaporation, the fruit usually does not attain the temperature of heating liquid. If during the dehydration, the temperature of the heat exchange liquid is elevated for a short period, puffing and extending of the fruit cell structure is effected.

If, after the desired degree of dehydration has been attained, the fruit is cooled while the reduced pressure is maintained until the fruit has attained a temperature approximating atmospheric temperatures of the order of 68° F.-90° F., the puffed, distended condition of the fruit is maintained; if the pressure is returned to atmospheric before the fruit has attained sufficient rigidity, the cell structure collapses, the fruit density is relatively high, but it is so dehydrated as to be relatively stable and resistant to mold and the like.

Summarizing: The fruit initially processed can be in a natural condition or it can be partially dehydrated as by sun drying or kiln drying to reduce the moisture content to some extent. The process briefly comprises subjecting fruit to a reduced pressure of the order of a half pound pressure absolute or less and to a temperature of 70°–100° C., usually only for a period of from 10 to 60 minutes, until the fruit contains 6% or less of water. Preferably during the dehydration, the pressure is reduced gradually to about 0.1 pound per square inch absolute to make maximum economic utilization of the application of the low pressure. If, during the dehydration, the temperature is increased for a minute or two to about 100°–125° C., the fruit will be further extended and the product will have a desired puffed appearance. After the dehydration, the pressure can be released while the heat exchange medium, e. g. the liquid, is in contact with the fruit so that the puffed or unpuffed fruit is impregnated therewith or with a gas admitted for this purpose.

The invention is particularly applicable to any fruit or like substance having a membranous cell structure capable of forming water vapor retaining pockets or cavities such as those fruits which I have mentioned. Materials having a coarse, non-membranous cell structure and of a fibrous nature such as melons cannot be puffed or distended although they can be dehydrated.

The practice of the process of this invention will become further apparent upon consideration of a presently preferred embodiment illustrative of one form of the invention.

I prefer to carry out my process in an apparatus of the form shown in the accompanying drawings, which are a part of the specifications of the present invention. With reference to the drawings.

Figure 1:
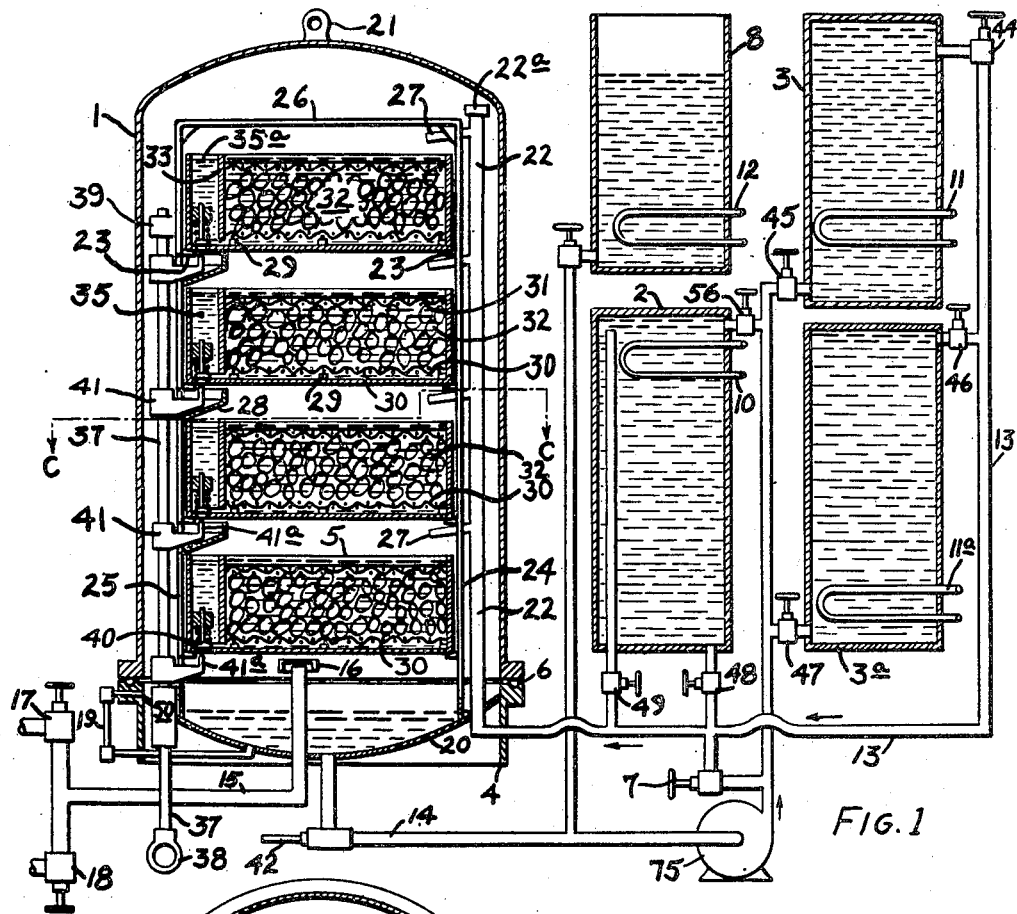
Figure 1 shows the general arrangement of apparatus with vessels shown in vertical half section, and the trays shown in section A—A of Figure 2.
Figure 2:
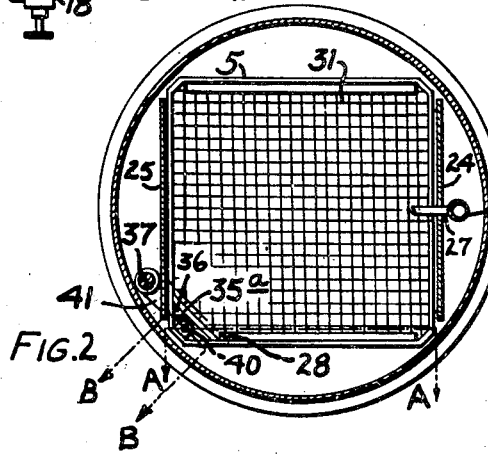
Figure 2 is a plan view of the processing chamber taken through section C—C of Figure 1.
Figure 3:
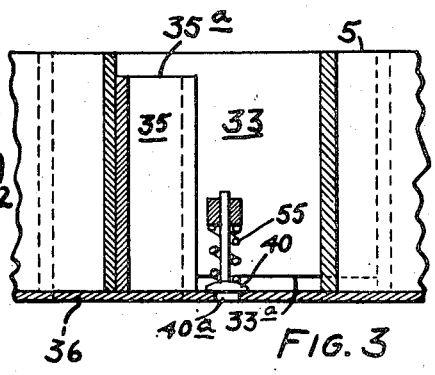
Figure 3 is a view of one of the trays taken through section B—B of Figure 2.

With reference to Figure 1, the processing chamber is composed in part of cover 1, base 4 and trays 5. The processing chamber is connected by means of inlet pipe 13 and outlet pipe 14 to cooling chamber 2, heating chambers 3 and 3a and supply tank 8. A vacuum line 15 extends into the base of the processing chamber and serves to connect through valve 17 with a vacuum pump. Cap 16 prevents splashes of oil from entering the vacuum line. By means of hook 21, cover 1 may be lifted from base 4 to allow the trays of fruit to be removed. The parting between cover 1 and base 4 occurs at a sealing junction 6. Trays 5 are supported on brackets 23 attached to upright panels 24 and 25. Panels 24 and 25 are attached at their lower end to bottom 20 of base 4 and at their upper end, the two panels are fastened to each other by means of cross brace 26.

A manifold 22 connects with the inlet pipe 13 and extends upwardly through the processing chamber. Outlets are provided in the manifold at locations suitable for the discharge of liquid into the trays. Liquid from outlets 27 passes through the trays and is discharged from the right-hand side of the trays into troughs 28. From 28, the liquid passes through suitable openings in panel 25 and drops to base 4 where it collects in bottom 20 and passes out through pipe 14. A liquid level gage 19 indicates the level of liquid remaining in bottom 20.

The trays 5 containing the food to be dehydrated are of special construction to permit proper circulation of the liquid through the food, and to permit the liquid to be drained from the food before the trays are removed from the processing chamber. Each of the trays contains a grid 29 on which is laid a screen 30 to hold the food 32. Over the food is a second screen 31 fastened to the tray by a bracket that permits the screen to be removed when the food is to be dumped. Screen 31 serves to hold the food submerged in the heating liquid. Attached to one corner of the tray is a baffle 33 that permits liquid to pass from the tray into the corner space only by way of a low level opening formed between the bottom edge 33a of baffle 33 and the floor of the tray. Another baffle 35 is arranged in the corner space, which permits only the upper level of liquid in the corner space to pass out of the tray and into trough 28 by way of passageway 36. This combination of baffles and passageways serve to drain from the bottom of the tray the cooler liquid that settles to the level of 33a, and simultaneously to maintain the liquid level above screen 31 by causing it to flow over the upper edge 35a of baffle 35.

When it is desired to drain substantially all of the liquid from the trays, a valve mechanism is utilized. This mechanism is constructed as follows: A rod 37 having a handle 38, a gland 50 and bearing 39 are provided. Rigidly mounted on rod 37 and engaging with valves 40 are tappets 41.

An upward push on handle 38 causes the ends 41a of tappets 41 to engage and raise valves 40, so permitting liquid from the trays to drain into troughs 28. A downward pull on the handle lowers the tappets and allows the valves to close under the impulse of valves springs 55. Gland 50 prevents leakage of air into the chamber.

Chambers 2, 3, 3a and 8 are provided with heat transfer coils 10, 11, 11a and 12 respectively.

I shall now describe a typical application of my new process, making use of the preferred form of apparatus as described in the preceding paragraphs. For example: By means of fluid of suitable temperature flowing through the heat transfer coils for the respective chambers, the liquids in chambers 3 and 8 are maintained at from 70° C. to 100° C., the liquid in chamber 3a is maintained at from 100° to 125° C., and liquid in chamber 2 is maintained below 60° C. Sun dried apples containing about 20% moisture are cut into particles and placed in the trays. The trays are slid on the racks into the processing chamber, and cover 1 is lowered to form a seal. Thereupon the chamber is evacuated to about 0.75 pounds per square inch absolute by suitable evacuating means connected to valve 17. A liquid at 70° C. to 100° C. from heater 3 passes through valve 44 and is circulated approximately ten minutes through pipe 13, manifold 22, out of orifices 27 and through the fruit by means of pump 75. Evaporation of moisture takes place; the vapor rises through screens 31 and is drawn off through pipe 15. Cool fat from the bottom of the trays overflows baffle 35a and passes to the bottom of the chamber to be recirculated by pump 75 through heater 3. Thermometer 42 indicates the temperature of the outgoing liquid. A similar thermometer may be installed on pipe 13 to indicate the temperature of the incoming liquid. The temperature of the fruit may be recorded by inserting suitable wire thermocouples into particles of fruit and leading the wires to a potentiometer outside of the chamber. To complete the dehydration and to puff the apples, valves 44 and 45 are closed, and valves 46 and 47 are opened to permit fat at a temperature of from 100° C. to 125° C. from chamber 3a to pass over the apples. This displaces the cooler liquid already covering the fruit, and increases the rate of evaporation sufficiently to inflate the apple particles by the rapid generation of vapor within the particles. If liquid at about 115° C. is in contact with the fruit for a period of not more than one or two minutes, puffing without material decomposition of the fruit sugars takes place. Then valves 46 and 47 are closed and cooler liquid is admitted to mix with other liquid in the system by opening valves 48 and 56 connecting with chamber 2. Valves 48 and 56 are allowed to remain open only sufficiently long to bring the average temperature of the liquid to approximately 70° C. Then valves 48 and 56 are closed, and valve 7 is opened to circulate and mix the liquid in the trays. To remove a gas which may be present in chamber 2 during the time when oil is circulating through this chamber, valve 49 may be opened momentarily. The fruit is then quickly cooled by admitting other cold liquid at 20° C. to 40° C. which is admitted to the trays by closing valve 7 and opening valves 48 and 56 to admit into line 13 the liquid in cooler 2. This liquid displaces the hot fat in the trays and cools the fruit. The dehydrated fruit should be cooled to a temperature whereat it is rigid; when the fruit contains 6% moisture, one should generally cool to about 50° F.; at a lesser moisture content, the cooling oil can be at a higher temperature and on fruit containing only 2% moisture I have successfully used oil at 100° F.

After allowing several minutes for that amount of cooling to occur that is required to give the fruit structural rigidity, the cool liquid may be injected into its pores and cells by slowly admitting air at normal atmospheric pressure into the processing chamber while the liquid still covers the fruit. Or, if it is desired to produce air-filled fruit, this may be accomplished by stopping the circulation of cool liquid, pushing upward on handle 38 to drain the liquid and, when the trays are drained, slowly admitting air to the chamber by opening valve 18.

While filling the cells and pores of a food with a liquid medium, it is essential to maintain the level of the liquid over the fruit. If absorption of liquid occurs more rapidly than the liquid is supplied by spouts 27, then the level of the liquid is liable to fall below screen 31, and portions of the food become exposed to the air. These portions would then become filled with air instead of liquid. To aid in preserving the liquid level above screen 31, a suitable level indicator or sight glasses in cover 1 may be installed which will enable the operator to determine the level in each tray. The operator will then admit air by regulating valve 18 in such a manner as to increase the air pressure sufficient to drive liquid into the fruit at a rate not exceeding that at which liquid is supplied by spouts 27.

Owing to the rapid evaporation of water from the fruit, the fruit temperature is maintained substantially below the temperature of the heating liquid. By means of thermocouples inserted into the interior of pieces of fruit, I have found that the fruit does not rise above 130° F. initially, even though the temperature of the heating liquid in contact with the fruit is higher by 100° F. By employing a very rapid circulation of hot liquid over the fruit particles, an extremely rapid rate of water evaporation may be maintained until the fruit juices are concentrated and the fruit temperature has risen to approximately a caramelizing temperature of 170° F. At this moment, the temperature of the liquid in contact with the fruit must be sharply reduced to 200° F. or lower, even to 180° F. in order to avoid overheating and caramelizing the fruit; dehydration proceeds at decreasing pressure until substantial dryness (2% or less) is achieved.

Rapid evaporation of moisture is suited to the manufacture of fruit products not requiring subsequent cooking such as dehydrated apple chips;

this product resembles potato chips, being made from apple slices about one eighth of an inch or one sixteenth of an inch or less in thickness. However, for other products such as puffed grapes or puffed apple for pies, a certain overpuffing or bloating is liable to result from extremely rapid evaporation; also, surface caramelization may result, the fruit surface being discolored without the interior being affected. Therefore, I prefer, when manufacturing the dried fruit products for the latter use, to limit the period when the liquid in contact with the fruit is at a temperature substantially above the caramelizing temperature. For example, I prefer to process fruit according to the following specific examples, although it is understood that I am not limited thereby except as set forth in the claims appended hereto.

Example 1

Eight hundred forty pounds of Gravenstein dried apples, containing 22% of moisture and 1000 parts per million of sulfur dioxide, were placed in a container upon which a vacuum was drawn to produce an absolute pressure within the flask of 0.75 pounds per square inch. Heated coconut oil at 234° F. was admitted to the vacuum container while vapors were continuously being removed by means of a suitable low temperature condenser and vacuum pump. The process was continued according to the following tabulation:

| Elapsed minutes | Absolute pressure pounds per square inch, abs. | Processing oil temperature, ° F. | Pounds water vapor removed | Approximate temperature of fruit, ° F. |
|---|---|---|---|---|
| 0 | .74 | 234 | 0 | 65 |
| 1 | .68 | 170 | 17.0 | 111 |
| 3 | .49 | 178 | 28.1 | 120 |
| 5 | .37 | 184 | 23.5 | 138 |
| 7 | .34 | 200 | 24.0 | 160 |
| 9 | .21 | 198 | 17.5 | 170 |
| 11 | .18 | 200 | 14.9 | 175 |
| 13 | .15 | 199 | 13.1 | 177 |
| 15 | .12 | 198 | 9.9 | 178 |
| 17 | .11 | 196 | 7.96 | 179 |
| 19 | .09 | 196 | 5.56 | 180 |
| 21 | .09 | 196 | 5.56 | 180 |
| 23 | .09 | 194 | 5.56 | 181 |

In the first minute of operation of the process, the hot oil was cooled rapidly by the cold metal of the vacuum container and by the cold fruit. This accounts for the lower rate of water vapor evolution during this period as compared with the rate for the second and subsequent minutes. In 23 minutes of operation a total of 173 pounds of water vapor were removed under absolute pressure conditions ranging from 0.74 initially to 0.09 pounds per square inch absolute at the end of the process.

At the conclusion of the evaporation, the liquid was drained from the fruit and cool cottonseed oil at less than 68° F. was admitted to circulate through the fruit and cool the slices to rigidity. Finally, the cool oil was drained away and air was admitted to the chamber. The product was a puffed crisp apple containing oil in the outermost layer of the pores of each slice. The moisture content of the apple was reduced from 20% to 1.5% and the sulfur dioxide from 1000 parts per million to approximately 100 parts. The total oil content was found by analysis to be 9.4%.

In some cases the final oil content may be higher, e. g. 15% to 20% depending upon the porosity of the particular apples and the speed with which the process is carried out. I have found that rapid dehydration causes a casehardening which is beneficial in those cases where a low oil content is desired; for example, in pie apples the casehardening acts to retard the entry of oil into the interior pores, and produces a puffed apple containing smaller proportion of oil.

Example 2

Fresh Newtown Pippin apples were peeled and cored and then sliced to approximately $\frac{1}{16}$ inch thickness. The slices containing about 84% moisture were immersed in 3% salt-65% sugar solution for 1 minute and were then placed in the vacuum vessel which was immediately evacuated. Heated coconut oil was then circulated through the slices while the absolute pressure was gradually reduced, until the apples were completely dehydrated.

| Elapsed minutes | Absolute pressure pounds per square inch | Processing oil temperature, ° F. | Approximate temperature of fruit, ° F. |
|---|---|---|---|
| 0 | 0.74 | 240 | 60 |
| 10 | 0.69 | 130 | 100 |
| 25 | 0.69 | 130 | 100 |
| 45 | 0.69 | 136 | 110 |
| 55 | 0.63 | 145 | 125 |
| 70 | 0.59 | 164 | 150 |
| 85 | 0.14 | 200 | 165 |
| 105 | 0.14 | 196 | 170 |
| 125 | 0.09 | 195 | 175 |
| 140 | 0.09 | 185 | 180 |

After 104 minutes had elapsed the fruit slices were cooled with cool oil, the oil was drained and air was let into the chamber to atmospheric pressure. The apple chips resembled potato chips; they were a pure white, crisp and delicious to taste, possessing unimpaired apple flavor and less than 2% moisture.

Example 3

Fresh Thompson Seedless grapes were cleaned of stems and placed in the vacuum vessel which was evacuated. Heated coconut oil was admitted and the treatment was carried out as tabulated:

| Elapsed minutes | Absolute pressure pounds per square inch | Processing oil temperature, ° F. | Approximate temperature of fruit, ° F. |
|---|---|---|---|
| 0 | .74 | 200 | 60 |
| 10 | .61 | 166 | 130 |
| 15 | .59 | 174 | 140 |
| 20 | .49 | 184 | 150 |
| 23 | .37 | 195 | 165 |
| 25 | .29 | 198 | 167 |
| 30 | .18 | 195 | 170 |
| 35 | .12 | 196 | 172 |
| 40 | .10 | 197 | 174 |
| 45 | .08 | 198 | 176 |
| 50 | .08 | 184 | 175 |
| 55 | .08 | 186 | 176 |
| 60 | .07 | 184 | 174 |

The processed Thompson Seedless grapes were fully puffed, crisp and had retained their original yellow-green color.

In order to produce a vacuum inexpensively, I prefer to utilize a vacuum system comprising a first stage booster ejector, which discharges into a booster condenser; air and water vapor not condensed by the latter are compressed by a second stage ejector that discharges into an intercondenser; air and water vapor not condensed by the intercondenser are further compressed to atmospheric pressure and ejected to the atmosphere by a third stage ejector.

It is a characteristic of such a system that it will handle large quantities of water vapor at relatively high absolute pressure, the cost of operation being not materially greater than when it is operating to handle smaller quantities of water vapor at relatively low absolute pressure.

To obtain a continuous reduction in pressure on the fruit during the evaporation, it is essential that one utilize a batch process. However, the desired dehydration may be obtained in a continuous process in which the fruit is continuously injected and removed from the chamber as in Hutteman Patent 1,929,691, providing the lowest absolute pressure required by the process is always maintained in the chamber.

In the present invention I may utilize not only whole or relatively large cut particles of fruit, but also comminuted fruit as fruit cakes which may be rapidly dehydrated and puffed by contact with a liquid at reduced pressures, according to the process described above, without causing substantial decomposition of the fruit sugars. Furthermore, puffed products containing in their cells either a gas, a liquid or a solid, may be produced.

Foods may be impregnated with any of a wide variety of liquids by conducting the desired liquid into contact with the food prior to the restoration of normal pressure. Thus puffed fruits may be impregnated with aqueous syrups, with condensed milk, with melted milk chocolate, with eggs albumin, gelatin solutions, or other liquids, by draining away under reduced pressure the heating or cooling liquid that may be in contact with the fruit and covering the fruit with the desired impregnating liquid prior to the restoration of normal pressure. Some such liquids will coagulate after they have been injected into the fruit to form fruit impregnated with solids. For example, the acid of the fruit causes coagulation of milk solids, and of egg albumin to take place shortly after milk or egg albumin has entered the cells of the fruit. Gelatine can be made to solidify and syrups can be caused to crystallize by allowing time to elapse and by reducing the temperature after impregnation.

Full cell impregnation is not limited to foods that have been dehydrated in the manner described. It is possible by this invention to impregnate any food having a porous or cellular structure and possessing sufficient structural rigidity to prevent collapsing under pressure. For example, puffed grains may be impregnated. Fruit processed by the method of my aforementioned United States Patent, namely No. 2,110,184, or other dehydrated fruits, fruit cakes or fruit powders may be evacuated of air and impregnated with fats or other liquids in the manner described in the preceding paragraphs.

It is known that dehydrated crisp fruits can be broken into particles of any desired size to produce granulated fruit and powdered fruit useful in baking. However, such products have the disadvantage that they tend to cake when stored or exposed to the atmosphere. When these products have caked, they are difficult to use in baking. To overcome this difficulty, I place such granulated or powdered fruit before caking into my new apparatus and impregnate them with a fat such as melted hydrogenated cottonseed oil. Thus, protected, the mass of fruit is not susceptible to caking, and the resulting product can be mixed with flour in a manner similar to that used for ordinary shortening. Grain flour may be similarly impregnated with a fat to produce a composition of flour and fat convenience for use in baking.

Following injection or impregnation of dehydrated foods with liquids containing water, or other solvent such as alcohol, the solvent may be removed from the food by a further heating under reduced pressure. This process of alternate injections and drying may be repeated any number of times until all of the pores and cells of the food are filled with a substance brought there through the medium of the solvent.

Many beneficial effects can be achieved. For example, rennet dissolved in a solvent may be injected into a food, the solvent may then be evaporated, and sweetened condensed skim milk or whole milk may then be injected into the food at about 25° C. to 45° C. whereupon the milk solids would be coagulated. If desired, the food may then be used, for example in ice cream, or the food may be dried further, reinjected with rennet and the process repeated until the food is filled with milk solids.

I have found that dehydrated food such as crisp fruit filled with a fat, with milk solids, or other substance, may be incorporated into frozen desserts such as ice cream, or it may be coated with a thick layer of fat or chocolate and incorporated into a frozen dessert without causing appreciable immediate loss of crispness or flavor. The result is a delicious cold dessert. Impregnated foods such as small crisp cookies may be similarly coated and/or impregnated to serve as confections, or for incorporation into ice cream.

I have found that uncoated dehydrated fruit impregnated with a fat may likewise be incorporated into ice cream and can be kept for extended periods of time without complete loss of crispness.

To produce an iced product that will remain uniform in storage, it is well to allow fat impregnated fruit to acquire moisture before it is incorporated into a frozen mixture such as ice cream. I have found that a convenient way to moisten the fruit is to sprinkle it gently with water, or expose it to a humid atmosphere, or submerge it in water momentarily.

An alternative method for producing a uniform iced product containing fat impregnated fruit is to allow the fruit time to attain equilibrium with the moisture in the iced product prior to consumption. Storing ice cream containing fat-impregnated fruit at a temperature of —5 to —10° C. for twenty-four to forty-eight hours will produce a product that will change but slightly when stored thereafter under the conditions customary for ice cream.

Fat impregnated fruit is useful in baking; in breads and cakes, the fat impregnated fruit retains its shape and firmness during cooking to a greater extent than dried fruit not impregnated.

I claim:

1. A process for dehydrating fruit comprising subjecting fruit to contact with an edible liquid of low vapor pressure at a temperature of 70°–100° C. and to a reduced pressure of less than about one half pound per square inch absolute pressure to reduce the water content of the fruit to less than 6% by weight, momentarily increasing the temperature of the liquid to about 100°–125° C. while said fruit is subject to said reduced pressure to puff said fruit, and cooling the dehydrated fruit under substantially said reduced pressure to maintain the puffed condition in the fruit.

2. A process for dehydrating fruit comprising subjecting fruit to contact with an edible liquid of low vapor pressure at a temperature of 70°–100° C. and to a reduced pressure of less than about one half pound per square inch absolute pressure, gradually further decreasing the pressure on the fruit and liquid to about 0.1 pound per square inch absolute to reduce the water content of the fruit finally to about 2% by weight, momentarily increasing the temperature of the liquid to about 100°–125° C. while said fruit is subject to said reduced pressure to puff said fruit, and cooling the dehydrated fruit under substantially said reduced pressure to maintain a puffed condition in the fruit.

3. A process as in claim 1 wherein the dehydrated fruit is cooled to about atmospheric temperature and air is then admitted into contact with the fruit to impregnate the puffed fruit.

4. A process as in claim 2 wherein the dehydrated fruit is cooled to about atmospheric temperature and air is then admitted into contact with the fruit to impregnate the puffed fruit.

5. A process for dehydrating fruit comprising subjecting fruit to contact with an edible liquid of relatively low vapor pressure and at a temperature of 70°–100° C., maintaining a reduced pressure of less than about one half pound per square inch absolute pressure on the fruit and liquid at said temperature for a time sufficient to reduce the water content of the fruit to less than 6% by weight, and cooling the fruit to about atmospheric temperature.

6. A process for dehydrating fruit comprising subjecting fruit to contact with an edible liquid of relatively low vapor pressure and at a temperature of 70°–100° C., and under a reduced pressure of less than about one half pound per square inch absolute pressure, gradually decreasing the pressure on the fruit and liquid to about 0.1 pound per square inch absolute to reduce the water content of the fruit finally to about 2% by weight, and cooling the fruit to about atmospheric temperature.

7. A process for dehydrating fruit comprising subjecting fruit to contact with an edible liquid of relatively low vapor pressure and at a temperature of 70°–100° C., maintaining a reduced pressure of less than about one half pound per square inch absolute pressure on the fruit and liquid at said temperature to reduce the water content of the fruit to less than 6% by weight, and cooling the dehydrated fruit under substantially said reduced pressure until the fruit is firm and rigid.

8. A process as in claim 1 wherein an edible liquid is admitted into contact with the fruit to impregnate the fruit as said reduced pressure is released to atmospheric.

9. A process as in claim 2 wherein an edible liquid is admitted into contact with the fruit to impregnate the fruit as said reduced pressure is released to atmospheric.

10. A process as in claim 7 wherein an edible liquid is admitted into contact with the fruit to impregnate the fruit as said reduced pressure is released to atmospheric.

WELLS ALAN WEBB.

REFERENCES CITED

The following references are of record in the file of this patent:

UNITED STATES PATENTS

| Number | Name | Date |
| --- | --- | --- |
| 1,035,838 | Anderson | Aug. 20, 1912 |
| 1,929,691 | Hutteman | Oct. 10, 1933 |
| 2,110,184 | Webb | Mar. 8, 1938 |
| 2,278,463 | Musher | Apr. 7, 1942 |